United States Patent
Li et al.

(10) Patent No.: US 12,236,259 B2
(45) Date of Patent: Feb. 25, 2025

(54) AUTONOMOUS AGGREGATION IDENTIFIER CALCULATION

(71) Applicant: STRIPE, INC., South San Francisco, CA (US)

(72) Inventors: Xin Li, San Jose, CA (US); Ben Xiang, Bellevue, WA (US); Stephen Chen, Oakland, CA (US)

(73) Assignee: STRIPE, INC., South San Francisco, CA (US)

( * ) Notice: Subject to any disclaimer, the term of this patent is extended or adjusted under 35 U.S.C. 154(b) by 565 days.

(21) Appl. No.: 17/522,585

(22) Filed: Nov. 9, 2021

(65) Prior Publication Data

US 2023/0145485 A1    May 11, 2023

(51) Int. Cl.
    G06F 9/46       (2006.01)
    G06Q 10/06      (2023.01)
    G06Q 10/067     (2023.01)

(52) U.S. Cl.
    CPC .......... *G06F 9/466* (2013.01); *G06Q 10/067* (2013.01)

(58) Field of Classification Search
    None
    See application file for complete search history.

(56) References Cited

U.S. PATENT DOCUMENTS

| | | | |
|---|---|---|---|
| 2007/0204340 A1* | 8/2007 | Karamchedu | G06Q 20/3825 726/17 |
| 2014/0282884 A1* | 9/2014 | Bao | G06F 21/316 726/4 |
| 2018/0158162 A1* | 6/2018 | Ramasamy | H04L 9/3239 |
| 2019/0158487 A1* | 5/2019 | Hayes | H04L 63/08 |
| 2020/0372014 A1* | 11/2020 | Boshmaf | G06F 16/245 |
| 2022/0006653 A1* | 1/2022 | Ghetie | H04L 9/002 |
| 2022/0067062 A1* | 3/2022 | Liu | G06F 16/219 |
| 2023/0153825 A1* | 5/2023 | Srivastava | G06F 11/008 707/703 |

* cited by examiner

*Primary Examiner* — Umut Onat
(74) *Attorney, Agent, or Firm* — Foley & Lardner LLP

(57) ABSTRACT

The subject technology performs a transaction locally at a computing node. The subject technology determines that the transaction has been completed. The subject technology determines a set of immutable attributes from the completed transaction. The subject technology generates an aggregate identifier based on the set of immutable attributes. The subject technology publishes the generated aggregate ID. The subject technology stores the published aggregate ID to an external storage location.

20 Claims, 10 Drawing Sheets

```
SELECT monotonically_increasing_id() as aggregate_id, LIST(elements.id)
FROM elements
GROUP BY elements.date
```
— 610

```
Elements
  .select(col("*"))
  .groupBy(col("date"))
  .agg(collect_list("id").as("element_ids"))
  .withColumn("aggregate_id", monotonically_increasing_id())
```
— 620

| Attribute | Type |
|---|---|
| event | String |
| account_type_a | String |
| account_type_b | String |
| effective_at | Long |
| currency_a | String |
| currency_b | String |
| ns_a | String |
| ns_b | String |
| payment_partner_a | String |
| payment_partner_b | String |
| accounting_date | Long |
| category | String |

```
AdditionalDimensionsOrdered.foreach { d =>
  val f: java.lang.reflect.Field =
aggregatedEdge.getClass.getDeclaredField(toCamelCase(d))
  f.setAccessible(true)
  f.get(aggregatedEdge)
    .asInstanceOf[Option[_]]
    .foreach(x => sha256.putBytes(x.toString.getBytes))
}
sha256.hash.toString.slice(0, 24)
```

FIG. 9

AUTONOMOUS AGGREGATION IDENTIFIER CALCULATION

TECHNICAL FIELD

The subject matter disclosed herein generally relates to the technical field of distributed data processing utilized in a network-based computing environment.

BACKGROUND

The present subject matter seeks to address technical problems that exist in distributed data processing.

BRIEF DESCRIPTION OF THE DRAWINGS

Some embodiments are illustrated by way of example and not limitation in the figures of the accompanying drawings.

FIG. 6 conceptually illustrates examples of code for data processing, according to example embodiments.

FIG. 8 illustrates example attributes in a data structure, in accordance with some embodiments of the present disclosure.

FIG. 9 conceptually illustrates examples of code for data processing to determine an aggregate ID, according to example embodiments.

DETAILED DESCRIPTION

Figure 1:
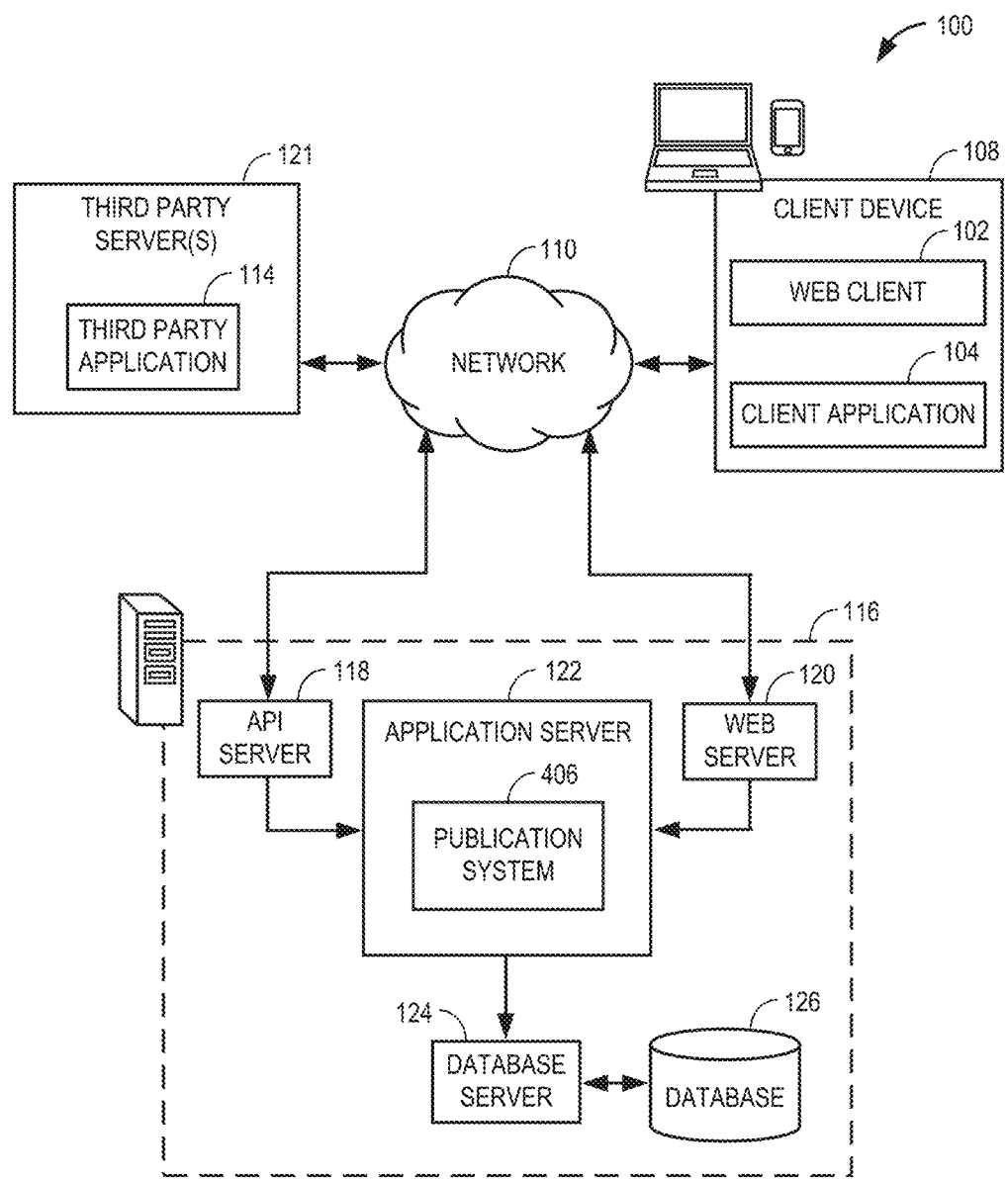
FIG. 1 is a block diagram illustrating a high-level network architecture, according to an example embodiment.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In the field of "big data", existing systems implement techniques for processing of large data sets, often in a distributed manner (e.g., across multiple clusters where each cluster includes multiple computers, servers, execution nodes, and the like). Such systems may provide a data processing engine in order to facilitate processing of such large data sets. For example, the Apache Spark™ data processing engine is one example of a data processing engine (or framework) that enables interactive SQL queries from various data sources (e.g., JSON, HDFS, Apache Hive™, JDBC, Apache ORC™, and Apache Parquet™), machine learning algorithms, resilient distributed datasets (RDDs) for distributed data, and graph processing algorithms, among other types of features and functionality.

As existing systems are responsible for processing data discussed above, such data is increasingly becoming larger over time (e.g., as the number of users are increasing, number of transactions are increasing due to at least in part growth of a business or entity, and the like), such systems may encounter various failures due to exhausting computing resources. In particular, processing and memory resources can be easily exhausted from handling too large of an amount of data, causing failures or errors in a given execution environment of such systems thereby degrading system performance or causing incorrect information to be provided in the context of analytics or other computing tasks.

In some examples, aggregation of data, e.g., where data is combined, is a computing task performed by a given data processing system. Even the task of aggregating data can encounter failures or errors as described above when computing resources, such as memory, is exhausted. Embodiments of the subject technology provide implementations to performing aggregations on data that avoids exhausting memory resources for the subject system.

A networked system, as described by embodiments herein, provides a computing environment for faster deployment of machine learning models. In example embodiments, the subject system utilizes container technology, such as a container platform, that allows several containers to run on the same host or virtual machine, each of which is a separate virtual environment or application. Further, in an example, a computing service (e.g., web service and the like) can deploy a machine learning model to a container for use in a given application.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as the publication system hosted at https://stripe.com by Stripe, Inc. of San Francisco, CA (herein "Stripe") as an example of a payment processor 530) that provides a number of functions and services to the client application 104 that accesses the networked system 116. The client application 104 also provides a number of interfaces described herein, which can present an output in accordance with the methods described herein to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 121, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., an "app" such as a payment processor app) accesses the various services and functions provided by the publication system 106 via the programmatic interface provided by the API server 118. The client application 104 may be, for example, an "app" executing on the client device 108, such as an IOS® or ANDROID® OS application to enable a user to access and input data on the networked system 116 in an offline manner and to perform batch-mode communications between the client application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
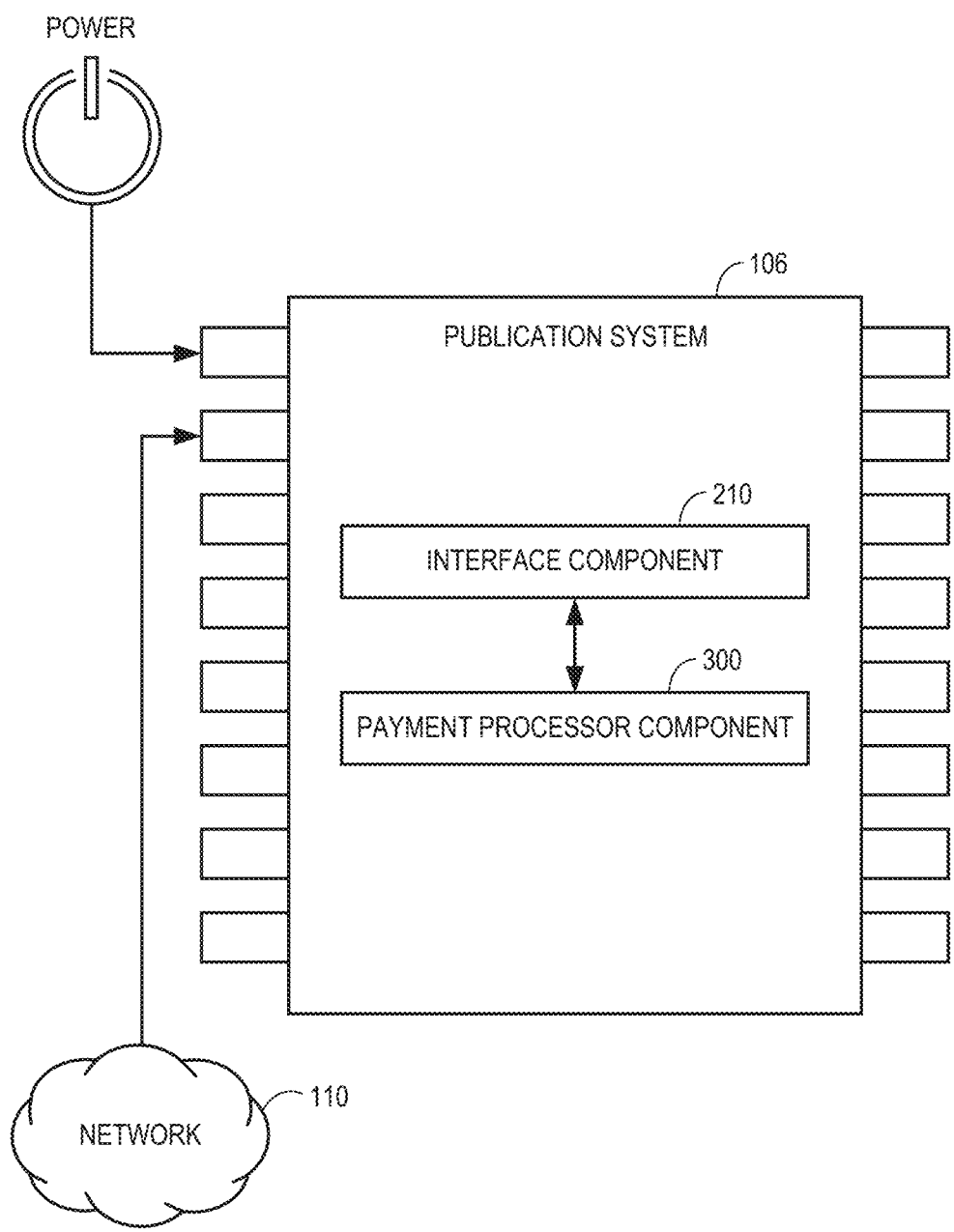
FIG. 2 is a block diagram showing architectural aspects of a publication system, according to some example embodiments.

FIG. 2 is a block diagram showing architectural details of a publication system 106, according to some example embodiments. Specifically, the publication system 106 is shown to include an interface component 210 by which the publication system 106 communicates (e.g., over a network 110) with other systems within the SaaS network architecture 100.

The interface component 210 is communicatively coupled to a payment processor component 300 that operates to provide payment processing functions for a payment processor (e.g., a payment processor 530, FIG. 5) in accordance with the methods described herein with reference to the accompanying drawings.

Figure 3:
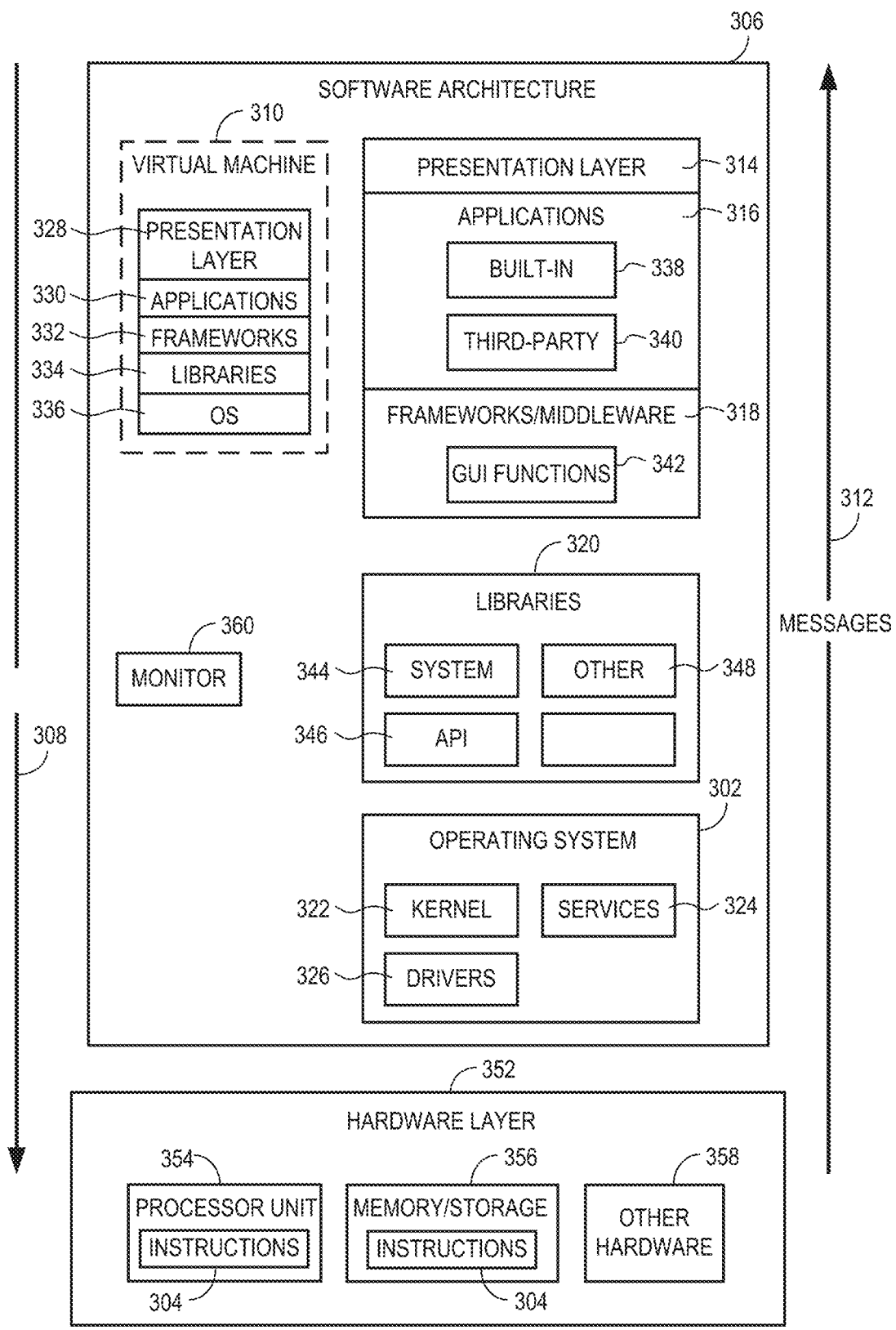
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 352 is illustrated and can represent, for example, the machine 400 of FIG. 4. The representative hardware layer 352 includes a processor 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
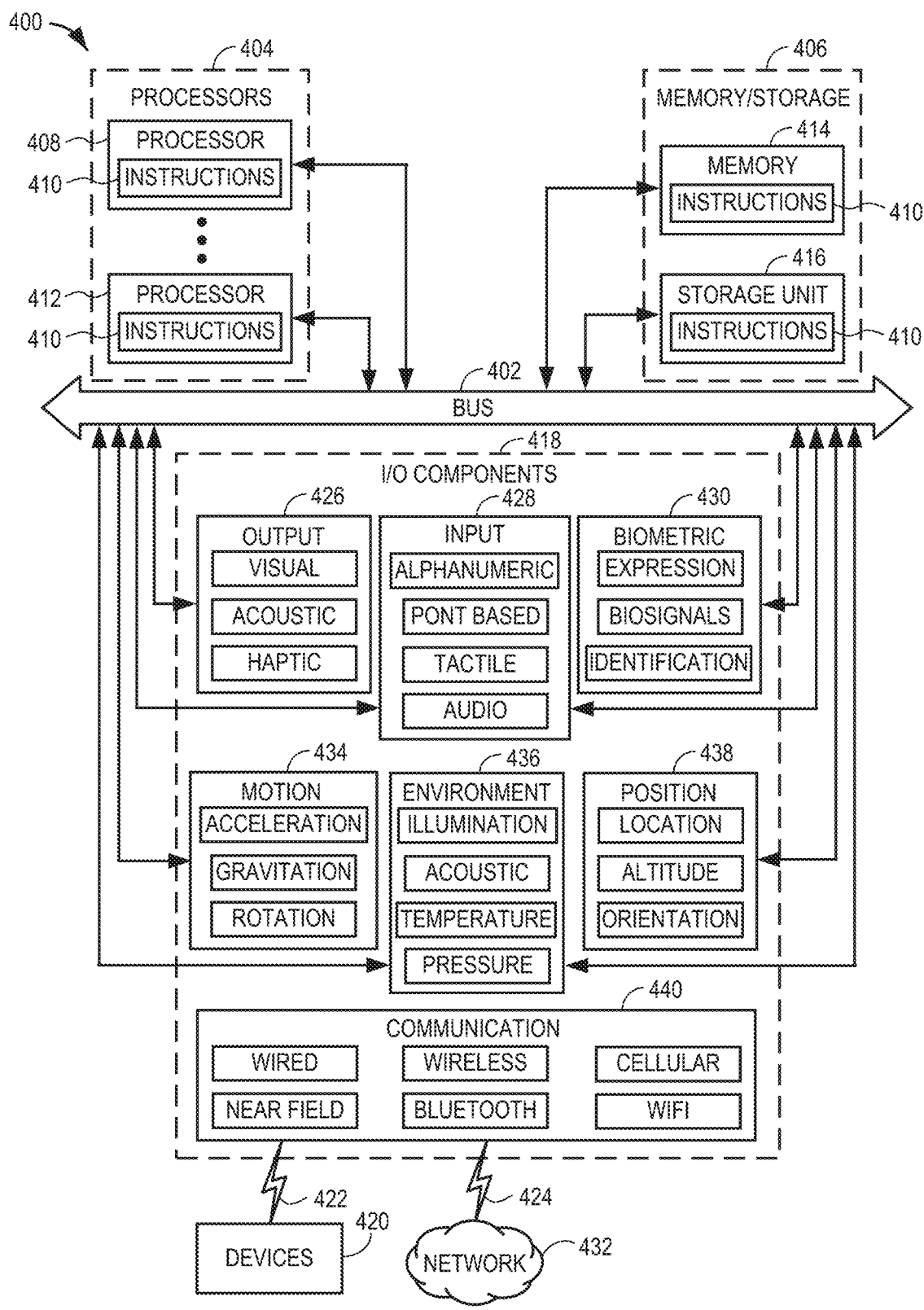
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

In some embodiments, a JAVASCRIPT® library can be embedded into a merchant's checkout form to handle credit card information. When a user attempts to complete a transaction using the checkout form, it sends the credit card information directly from the user's browser to the payment processor's servers. The JAVASCRIPT® library provides merchants with a set of technologies that can be easily and quickly integrated to securely accept payments online. With the JAVASCRIPT® library, merchants retain full control of their customers' payment flows, but their servers are never exposed to sensitive payment information.

When added to a merchant's payment form, the JAVASCRIPT® library automatically intercepts the payment form submission, sending payment information directly to the payment processor and converting it to a single-use token. The single-use token can be safely passed to the merchant's systems and used later to charge customers. Merchants have complete control of their customers' payment experience without ever handling, processing, or storing sensitive payment information.

Figure 5:
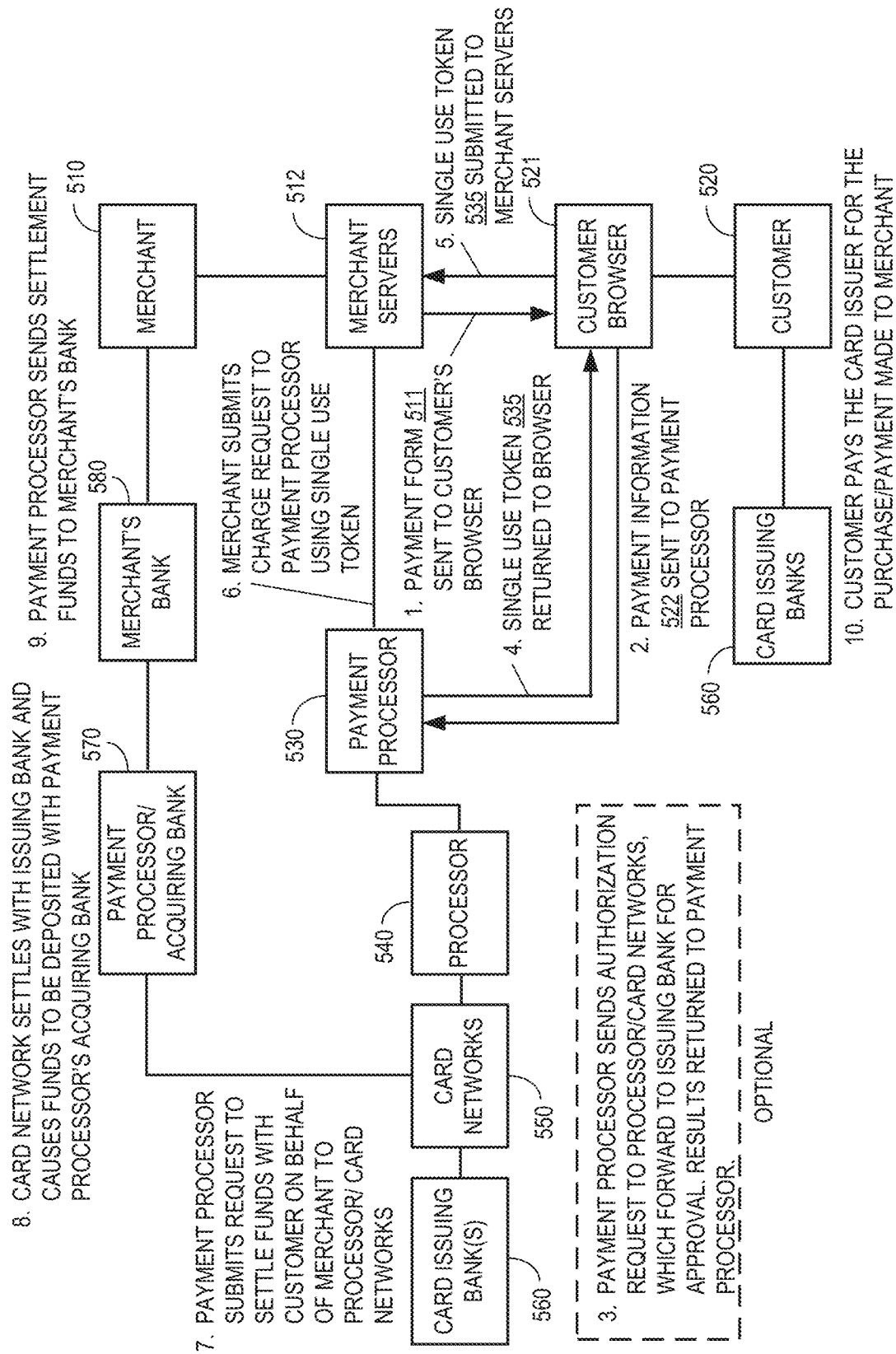
FIG. 5 conceptually illustrates examples of code showing aspects of an online method for conducting a transaction between a merchant site and an electronic user device using a payment processor, according to an example embodiment.

Viewed generally in one example, and with reference to FIG. 5, a payment processing flow is now described:

1. The merchant's customer 520 uses an Internet-enabled browser 521 to visit the merchant's site. The customer 520 is served a JAVASCRIPT® library-enabled payment form 511 using standard web technologies. The customer 520 enters the specified information including their payment information 522 and submits the payment form 511. The billing info portion of the payment form 511 is for payment via a credit card or debit card. If payment is to be made via an ACH transaction, the billing info portion of the payment form 511 will request a bank routing number and an account number within that bank, and possibly additional information, such as the bank name and whether the account is a checking or savings account.

2. The customer's payment information 522 is sent from the customer's browser 521 to the payment processor 530, never touching the merchant servers 512. In this manner, the client-side application electronically sends payment information retrieved from the customer's electronic device to the payment processor 530. The client-side application does not send the payment information 522 to the server-side application.

3. In one preferred embodiment, the payment processor 530 submits the relevant transaction to a processor 540 or directly to the card network 550 for authorization or validation of the payment information. The card network 550 sends the request to the card issuing bank 560, which authorizes the transaction. In this embodiment, the payment processor 530 and the processor 540/card network 550 function together as a payment processor. In another example embodiment, this step is performed without any communication to the processor 540/card network 550. Instead, the payment processor 530 performs its own authorization or validation of the payment information using heuristic means, such as by checking the Bank Identification Number (BIN), also referred to as the Issuer Identification Number (IIN), against a database of known, valid BINs on file with the payment processor 530. (The BIN is a part of the bank card number, namely the first six digits.) In yet another example embodiment, this step is not performed at all since the authorization or validation is not necessary for the next step (4) to succeed. That is, it is acceptable to create a single-use token in step (4) that represents payment information which has not been validated in any way.

4. If authorized, the payment processor 530 will generate and return a secure, single-use token 535 to the customer's browser 521 that represents the customer's payment information but does not leak any sensitive information. In the example embodiment wherein step (3) is not performed, the payment processor 530 performs this step without waiting to receive authorization from the processor 540 or the card network 550. In this manner, the payment processor 530 creates the token 535 from the payment information sent by the client-side application, wherein the token 535 functions as a proxy for the payment information 522.

5. The payment form 511 is submitted to the merchant servers 512, including the single-use token 535. More specifically, the payment processor 530 sends the token 535 to the client-side application, which, in turn, sends the token 535 to the server-side application for use by the server-side application in conducting the transaction.

6. The merchant 510 uses the single-use token 535 to submit a charge request to the payment processor 530 (or to create a customer object for later use). In this step, the payment processor 530 submits a request to authorize the charge to the processor 540 or directly to the card network 550.

This authorization specifies the actual amount to charge the credit card. If an authorization was already done in step (3) for the correct amount, this authorization request can be skipped. This may be a one-time payment for a merchant item, or it may involve registering the payment information with the merchant site for subsequent use in making a payment for a merchant item (a so-called "card on file" scenario). Using the process described in steps (1) through (6), the payment information can be used by the server-side application via the token 535 without the server-side application being exposed to the payment information.

7. The payment processor 530 settles the charge on behalf of the merchant 510 with the processor 540 or directly with the card network 550.

8. The card network 550 causes the funds to be paid by the card issuing bank 560 to the payment processor 530 or to the payment processor's acquiring bank 570.

9. The payment processor 530 causes the settled funds to be sent to the merchant 510 (or to the merchant's bank 580), net of any applicable fees.

10. The card issuing bank 560 collects the paid funds from the customer 520.

Not all of the steps listed above need happen in real time. Other examples, arrangements, and functionality are possible. Applicant's published patent application US 2013/0117185 A1 is incorporated by reference in its entirety in this regard. Typically, when the merchant's customer submits the payment form in step (1), steps (1) through (6) happen in real time and steps (7) through (10) happen later, usually once per day, as a batch process settling all of the funds for all of the payment processor's merchants. In some examples, the payment processor uses an HTTP-based tokenization API in steps (2) and (4) above. Some broader examples may be considered as "tokenization as a service," in which any data is tokenized. One general example may facilitate a merger and acquisition (M&A) analysis in which companies want to compare an overlap in their customer bases. A payment processor (acting as a tokenization service) can tokenize the customers of each company and compare the overlap without revealing confidential information to either party. Unique payment tokens can be adapted to enable and facilitate such a tokenization service.

A practice in large-scale distributed data processing is to establish a relationship between aggregation and their constituents in a given data processing system. However, existing systems may not be able to handle a large amount of constituents when a dominant number of constituents belong to a single aggregation. In particular, in such an existing system, memory (e.g., buffer) may be exhausted causing the system to fail or return errors during execution. For example, memory can be exhausted when each constituent has a unique id from a growing set of multiple constituents and a number of unique constituents increases over a short period of time. Moreover, in such an existing system, a monolithic approach may be utilized Embodiments of the subject technology advantageously provide more efficient approaches and techniques for handling an aggregation by abandoning a monolithic or centralized aggregation and enabling constituents to autonomously compute the final aggregation that they belong when various (necessary) conditions are met.

In existing approaches, skewed data distribution could raise concentration of elements in a single aggregation where such a concentration of elements created an object that exceeded the memory limitation of a given worker node.

Even without the skewed data distribution discussed above, the aforementioned aggregation approach could still stop working as must aggregation of a large amount of raw transactions occurs as a given system grows in a number of transactions (e.g., due to increasing amounts of users).

Consequently, existing systems face problems with scalability. The subject technology provides techniques for autonomous aggregation, where elements can independently calculate an aggregation-constituents relationship without being concentrated and hence overcome the scalability challenges.

FIG. 6 conceptually illustrates examples of code for data processing, according to example embodiments.

Building the relationship between an aggregation and its constituents is a practice in data processing in order to connect artifacts (aggregation) and facts (constituents), abstractions (aggregation) and the concrete (constituents), or roll-ups (aggregation) and elements (constituents), etc. One approach to this task is shown in a pattern in SQL as code 610.

This pattern has been widely followed in multi-dimensional, distributed data processing platform (e.g., Apache Spark™) where a typical piece of logic that computes the aggregation-constituent relationship has a pattern shown in code 620.

In an example, an aggregation is used to model a compositional relationship between model elements. Some examples of compositional relationships can include e.g., a library includes books, a company includes departments that include employees, a computer includes a number of hardware components, a household includes a number of persons. To model such relationships, a given aggregate (e.g., department) has an association to a set of constituents (e.g., employee).

An existing way of computing the aggregation constituents relationship sends all constituents to a centralized location so that the aggregate function have a complete view of all constituents to participate in a specific aggregation.

The aggregate stage of the diagram throttles the creation of the constituent relationship if the number of constituents is huge such that the aggregate stage cannot hold all the constituents in memory. However, this problem cannot be mitigated by simply adding more aggregate hosts if all the constituents belong to a single aggregate. Ultimately all the constituents need to be collected in a single location in order to produce the aggregate result.

An alternative approach, frequently adopted in practice, introduces a salt to the aggregation. Examples of a salt can be random data utilized in conjunction with another function (e.g., hash, cryptography, and the like). The effect of a salt can split the constituents into finer cohorts such that the number of constituents for each aggregation is reduced to an extent that can fit (e.g., stored) in the memory of a single aggregation (e.g., when each aggregation has memory restrictions or size limitations). In an example, the salt has to be deterministic in order for the aggregate identifier (ID) to stay consistent for a given set of constituents.

The approach of adding salt has been utilized for many practical situations. However, there are critical drawbacks to this approach. The number of aggregates may increase in a undesired way. It is difficult to adjust the salt in order to achieve a balance between increase of aggregates and decrease of memory demanding for an aggregation. As the number of constituents keep growing (e.g., from business growth such as increased transactions or increased users), the salt-based approach will still face similar disadvantages as already discussed herein.

Embodiments of the subject technology improve upon the aforementioned existing approaches as discussed in the following.

Figure 7:
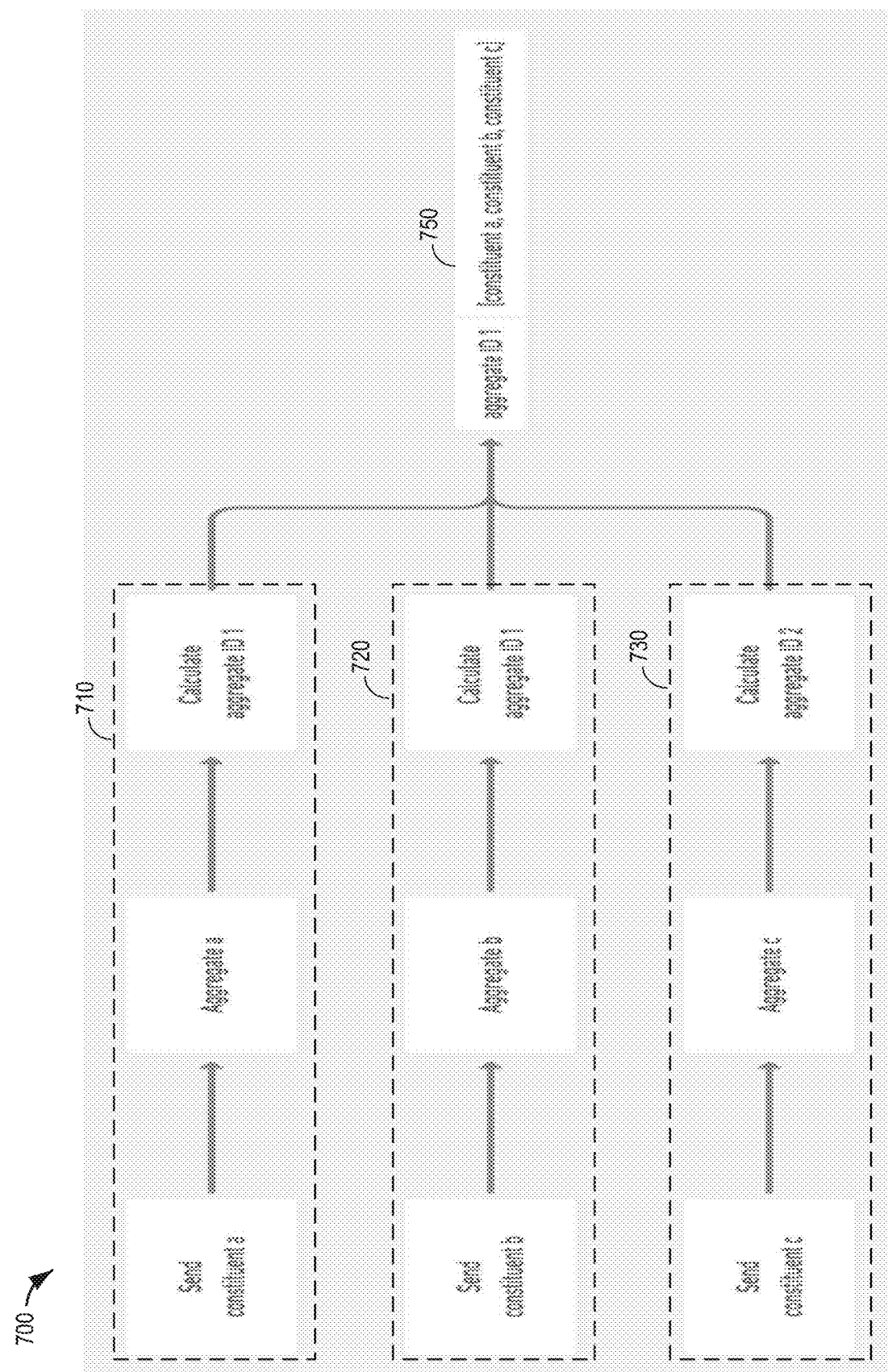
FIG. 7 is a conceptual illustration of a block diagram of a data flow for processing data in a distributed system, in accordance with some embodiments of the present disclosure.

FIG. 7 is a conceptual illustration of a block diagram of a data flow 700 for processing data in a distributed system, in accordance with some embodiments of the present disclosure.

As illustrated, data flow 700 represents a distributed approach where constituents calculate the end result independently without being collected or processed in a centralized location (e.g., a centralized server). In the example of FIG. 7, data flow portion 710, data flow portion 720, and data flow portion 730 include respective operations for calculating an aggregate ID based on an associated constituent. Each data flow portion can be processed at a given computing node, where each computing node may be a different computing node in a same cluster (e.g., group of computing nodes), or at a different cluster (.e.g., different group of computing nodes). In particular, the respective operations utilize a data structure discussed in more detail in FIG. 8 below to determine a respective aggregate ID, which can be determined without a centralized server.

FIG. 8 illustrates example attributes in a data structure 800, in accordance with some embodiments of the present disclosure.

In embodiments, a need for a centralized location for aggregation (e.g., centralized server) is removed by carefully designing the aggregate ID calculation scheme such that the aggregate ID is deterministic and depends on the immutable attributes/properties (e.g., attributes or properties that cannot be changed after being set) of the constituents. In some cases, where the constituents are part of a given transaction object (e.g., an object including information related to a particular transaction that has been completed), an example set of (immutable) attributes that satisfy the requirements are shown in data structure 800 which includes respective attributes that are used for aggregate ID calculation.

The aggregate ID of constituents of given transaction object can be calculated deterministically and uniquely in an embodiment. In other words, the constituent belongs to one and only one aggregate. When this condition is satisfied, the aggregate ID calculation can be computed in a pure distributed way without collecting all the constituents together (e.g., by a centralized server).

As illustrated, data structure 800 represents information for a given transaction (e.g., moving currency or monies from a first account to a second account) includes attributes for an event (e.g., event information related to the transaction), first account type ("account type a"), second account type ("account type b"), when the transaction occurred ("effective at"), first type of currency ("currency a"), second type of currency ("currency b"), first legal entity ("ns_a"), second legal entity ("ns_b"), first payment partner ("payment partner a"), second payment partner ("payment partner b"), accounting date, and category.

After a transaction is completed, the aforementioned attributes related to the transaction are considered immutable attributes and therefore can be utilized to generate a unique aggregate ID locally (e.g., at a given computing node). In embodiments, a suitable number of immutable attributes are utilized to generate a unique aggregate ID. For example, a number of immutable attributes greater than a threshold number (e.g., 10 or more to guarantee a sufficient random distribution of unique aggregate IDs) is utilized to generate the unique aggregate ID. Further, in embodiments, a hash algorithm such as SHA-256 hash algorithm is utilized to generate the unique aggregate ID based on the immutable attributes.

After each aggregate ID is determined for each data flow portion 710, data flow portion 720, and data flow portion 730, in data flow portion 750, an aggregate ID along with each constituent (e.g., constituent a, constituent b, and constituent c) can be provided. In an embodiment, the aggregate ID can be stored in external storage (e.g., cloud storage, and the like), which facilitates another application to be able to read the aggregate ID for the transaction to perform analytics and other tasks at a later time.

FIG. 9 conceptually illustrates examples of code for data processing to determine an aggregate ID, according to example embodiments.

In the example of FIG. 9, code 900 represents an implementation for distributed aggregate ID calculation that deals with an individual case class object wrapped in a function, and is robust and easy to test and debug.

In embodiments, code 900 can be executed locally (e.g., on a given computing node). For example, another piece of code that is executing locally (e.g., a transaction object corresponding to a given transaction) can call a method corresponding to "fromLedgerFinanceEdge" to determine an aggregate ID for a given transaction.

Figure 10:
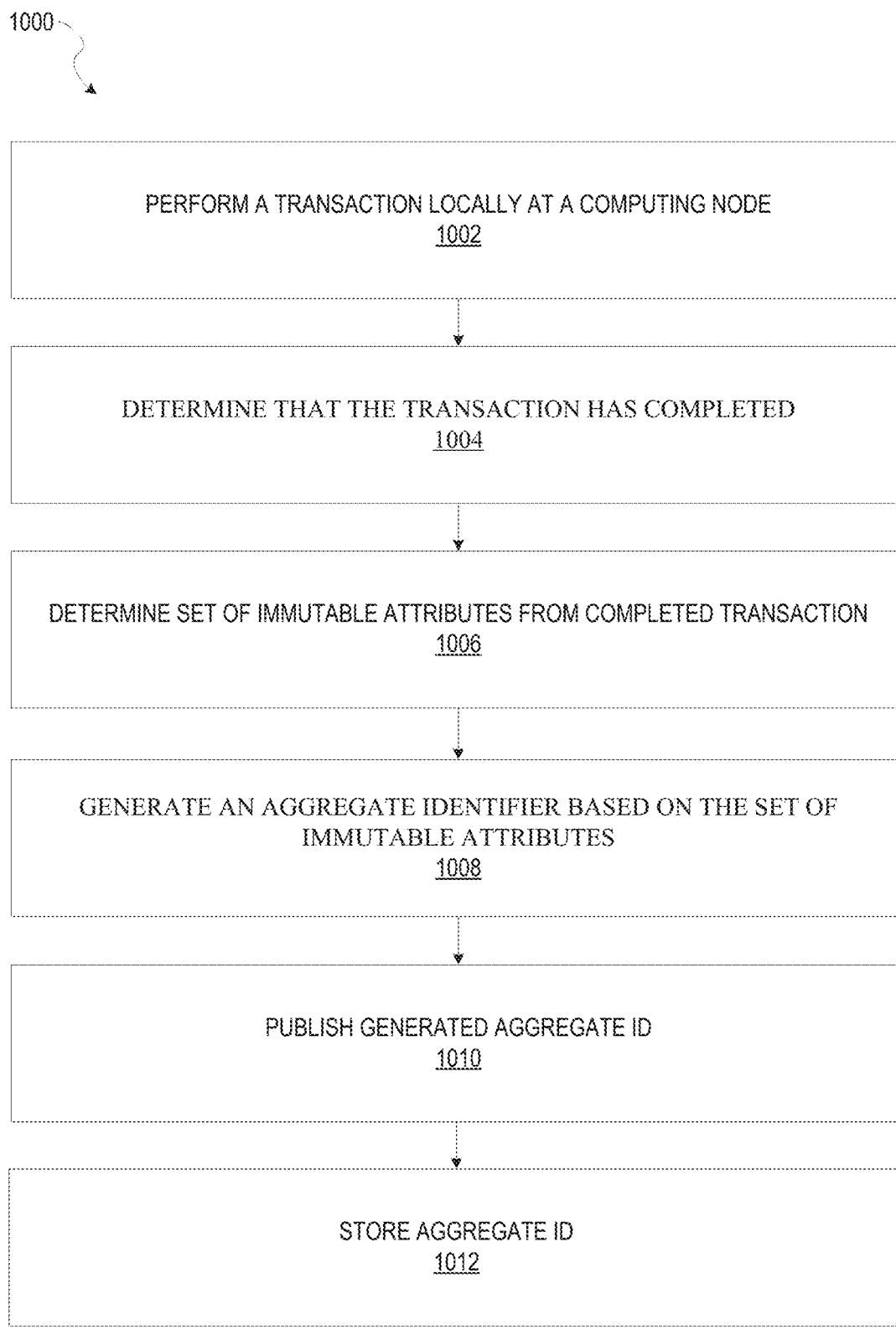
FIG. 10 is a flow diagram illustrating a method, in accordance with some embodiments of the present disclosure.

FIG. 10 is a flow diagram illustrating a method 1000, in accordance with some embodiments of the present disclosure. The method 1000 may be embodied in computer-readable instructions for execution by one or more hardware components (e.g., one or more processors) such that the operations of the method 1000 may be performed by components of software architecture 306 and hardware layer 352. Accordingly, the method 1000 is described below, by way of example with reference thereto. However, it shall be appreciated that the method 1000 may be deployed on various other hardware configurations and is not intended to be limited to deployment within software architecture 306.

At operation 1002, software architecture 306 performs a transaction locally at a computing node. In an implementations, performing the transaction is based on a transaction object provided locally at the computing node. The transaction object invokes an object method call to generate the aggregate ID based on the set of immutable attributes.

At operation 1004, software architecture 306 determines that the transaction has been completed. Determining the transaction has been completed is based on at least one attribute, from a set of immutable attributes, indicating that the transaction has been completed.

At operation 1006, software architecture 306 determines a set of immutable attributes from the completed transaction. In an example, the set of immutable attributes includes a number of attributes greater than a threshold number. In an example, the threshold number is greater than 10.

In an example, the set of immutable attributes comprises information related to an event, a first account type, a second account type, an effective time of the completed transaction, a first type of currency, a second type of currency, a first legal entity, a second legal entity, a first payment partner, a second payment partner, an accounting date, and a category.

At operation 1008, software architecture 306 generates an aggregate identifier (ID) based on the set of immutable attributes. In an example, generating the aggregate ID comprises providing respective values for each of the set of immutable attributes as input values to a hash algorithm, and generating, using the hash algorithm, the aggregate ID. In an implementation, the hash algorithm comprises SHA-256.

At operation 1010, software architecture 306 publishes the generated aggregate ID.

At operation 1012, software architecture 306 stores the published aggregate ID to an external storage location. In an example, storing the published aggregate ID to the external storage location comprises sending the published ID to a cloud storage platform.

The following discussion relates to various terms and phrases that are mentioned in the disclosure.

"Carrier Signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smart phone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component")

should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

In another context, a "Processor" (e.g., a processor 540 in FIG. 5) is a company (often a third party) appointed to handle payment card (e.g., credit card, debit card) transactions. They have connections to various card networks and supply authorization and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB®, and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" or "Issuing Bank" in this context refers to a bank that offers card network or association-branded payment cards directly to consumers. An issuing bank assumes primary liability for the consumer's capacity to pay off debts they incur with their card.

"Payment Information" includes information generally required to complete a transaction, and the specific type of information provided may vary by payment type. Some payment information will be sensitive (e.g., the card validation code), while other information might not be (e.g., a zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Sensitive information" may not necessarily be related to payment information and may include other confidential personal information, such as medical (e.g., HIPAA) information, for example. The ambit of the term "Payment Information" includes "Sensitive Information" within its scope. In some examples, sensitive payment information may include "regulated payment information," which may change over time. For example, currently a merchant cannot collect more than the first six (6) or the last four (4) numbers of a customer's PAN without generally needing to comply with Payment Card Industry (PCI) regulations. But card number lengths may change, and when they do, the "6 and 4" rules will likely change with them. These potential future changes are incorporated within the ambit of "regulated payment information," which is, in turn, included within the ambit of the term "payment information" as defined herein.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site" in this context refers to an e-commerce site or portal (e.g., website, or mobile app) of the merchant. In some embodiments, the merchant (e.g., a merchant 510 of FIG. 5) and merchant servers (e.g., merchant servers 512 of FIG. 5) are associated with the merchant site. The merchant site is associated with a client-side application and a server-side application. In one example embodiment, the merchant site includes the merchant servers 512 of FIG. 5, and the server-side application executes on the merchant servers 512.

"Payment Processor" in this context (e.g., a payment processor 530 in FIG. 5) refers to an entity or a plurality of entities and associated software components and/or hardware components (e.g., hardware processors, virtual processors executing on top of hardware processors, servers, computing platforms, storage, security mechanisms, encryption hardware/devices), among other types of computing resources (e.g., network, bandwidth, CPU processing, and the like) that facilitate and process a transaction, for example between a merchant and a customer's electronic device. With reference to a high-level description illustrated in FIG. 5, in some examples described more fully below, the payment processor includes selected functionality of both the payment processor 530 and the processor 540/card networks 550. For example, the payment processor 530 creates tokens and maintains and verifies publishable (non-secret) keys and secret keys. In the illustrated example, the processor 540/card networks 550 are involved in authorizing or validating payment information. In one example embodiment, the payment processor 530 and the processor 540/card networks 550 function together to authorize and validate payment information, issue a token, and settle any charges that are made. Accordingly, in this embodiment, "payment processor" refers to the functionality of the payment processor 530 and the functionality of the processor 540/card networks 550. In another example embodiment, wherein step (3) in the high-level description is not performed, and the payment processor 530 performs its own verification before issuing a token, the processor 540/card networks 550 are still used for settling any charges that are made, as described in step (7). Accordingly, in this embodiment, "payment processor" may refer only to the functionality of the payment processor 530 with respect to issuing tokens. Further, in the example arrangement shown, the payment processor 530, the processor 540, and the card networks 550 are shown as separate entities. In some examples, their respective functions may be performed by two entities, or even just one entity, with the entities themselves being configured accordingly.

"Native Application" or "native app" in this context refers to an app commonly used with a mobile device, such as a smart phone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which may require interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2020, Stripe, Inc., All Rights Reserved.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of generating aggregate identifiers across an environment of distributed devices for improving integrity of a network operation, the method comprising:
    obtaining, by at least one processor of a first device, a network operation object at a computing node, the network operation object associated with an object method call to generate an aggregate identifier (aggregate ID) for the network operation;
    performing, by the at least one processor of the first device, the network operation locally at the computing node based on the network operation object;
    determining, by the at least one processor of the first device, that the network operation has been completed based on an immutable attribute;
    determining, by the at least one processor of the first device, a set of immutable attributes from the network operation completed based on the immutable attribute, the set of immutable attributes comprising the immutable attribute involved in generating the aggregate ID;
    responsive to execution of the object method call, generating, by the at least one processor of the first device, the aggregate ID based on the set of immutable attributes; and
    transmitting, by the at least one processor of the first device, the aggregate ID to an external storage location comprising a plurality of aggregate IDs to cause a second device to determine the aggregate ID is valid.

2. The method of claim 1, wherein the transaction object invokes an object method call to generate the aggregate ID based on the set of immutable attributes.

3. The method of claim 1, wherein the set of immutable attributes includes a number of attributes greater than a threshold number.

4. The method of claim 3, wherein the threshold number is greater than 10.

5. The method of claim 4, wherein generating the aggregate ID comprises:
    providing respective values for each of the set of immutable attributes as input values to a hash algorithm; and
    generating, using the hash algorithm, the aggregate ID.

6. The method of claim 5, wherein the hash algorithm comprises SHA-256.

7. The method of claim 1, wherein determining the transaction has been completed is based on at least one attribute, from the set of immutable attributes, indicating that the transaction has been completed.

8. The method of claim 1, wherein storing the published aggregate ID to the external storage location comprises sending the published ID to a cloud storage platform.

9. The method of claim 1, wherein the set of immutable attributes comprises information related to an event, a first account type, a second account type, an effective time of the completed transaction, a first type of currency, a second type of currency, a first legal entity, a second legal entity, a first payment partner, a second payment partner, an accounting date, and a category.

10. The method of claim 1, wherein causing a second device to determine the aggregate ID is valid comprises:
    causing a second device associated with a second computing node to determine that the aggregate ID generated by the first device is valid.

11. A system for generating aggregate identifiers across an environment of distributed devices for improving integrity of a network operation, the system comprising:
    a network;
    one or more processors; and
    a memory storing instructions that, when executed by at least one processor among the one or more processors, cause the at least one processor to perform operations comprising:
        obtaining, by the at least one processor of a first device, a network operation object at a computing node, the network operation object associated with an object method call to generate an aggregate identifier (aggregate ID) for the network operation;
        performing, by the at least one processor of the first device, the network operation locally at the computing node based on the network operation object;
        determining, by the at least one processor of the first device, that the network operation has been completed based on an immutable attribute;
        determining, by the at least one processor of the first device, a set of immutable attributes from the network operation completed based on the immutable attribute, the set of immutable attributes comprising the immutable attribute involved in generating the aggregate ID;
        responsive to execution of the object method call, generating, by the at least one processor of the first device, the aggregate ID based on the set of immutable attributes; and
        transmitting, by the at least one processor of the first device, the aggregate ID to an external storage location comprising a plurality of aggregate IDs to cause a second device to determine the aggregate ID is valid.

12. The system of claim 11, wherein the transaction object invokes an object method call to generate the aggregate ID based on the set of immutable attributes.

13. The system of claim 11, wherein the set of immutable attributes includes a number of attributes greater than a threshold number.

14. The system of claim 13, wherein the threshold number is greater than 10.

15. The system of claim 14, wherein generating the aggregate ID comprises:
    providing respective values for each of the set of immutable attributes as input values to a hash algorithm; and
    generating, using the hash algorithm, the aggregate ID.

16. The system of claim 15, wherein the hash algorithm comprises SHA-256.

17. The system of claim 11, wherein determining the transaction has been completed is based on at least one attribute, from the set of immutable attributes, indicating that the transaction has been completed.

18. The system of claim 11, wherein storing the published aggregate ID to the external storage location comprises sending the published ID to a cloud storage platform.

19. The system of claim 11, wherein the one or more processors that cause a second device to determine the aggregate ID is valid are further configured to:
    cause a second device associated with a second computing node to determine that the aggregate ID generated by the first device is valid.

20. A non-transitory machine-readable medium comprising instructions which, when read by a machine of a first device, cause the machine to perform operations comprising:
- obtaining a network operation object at a computing node, the network operation object associated with an object method call to generate an aggregate identifier (aggregate ID) for a network operation;
- performing the network operation locally at the computing node based on the network operation object;
- determining that the network operation has been completed based on an immutable attribute;
- determining a set of immutable attributes from the network operation completed based on the immutable attribute, the set of immutable attributes comprising the immutable attribute involved in generating the aggregate ID;
- responsive to execution of the object method call, generating the aggregate ID based on the set of immutable attributes; and
- transmitting the generated aggregate ID to an external storage location comprising a plurality of aggregate IDs to cause a second device to determine the aggregate ID is valid.

* * * * *